United States Patent [19]

Sami

[11] Patent Number: 5,189,884
[45] Date of Patent: Mar. 2, 1993

[54] PASSIVE HEAT PUMP WITH NON-AZEOTROPIC REFRIGERANT

[76] Inventor: Samuel M. Sami, University of Moncton, R.C.E.C., Moncton, N.B., E1A 3E9, Canada

[21] Appl. No.: 694,948

[22] Filed: May 2, 1991

[51] Int. Cl.$^5$ .......................... F25B 47/00; C09K 5/04
[52] U.S. Cl. ....................................... 62/114; 62/324.2; 62/332; 252/67; 165/104.13
[58] Field of Search ..................... 62/324.1, 324.2, 114, 62/79, 332; 165/104.13, 104.21; 252/67

[56] References Cited

U.S. PATENT DOCUMENTS

| 3,789,621 | 2/1974 | Inuzuka | 62/324.1 |
| 4,303,536 | 12/1981 | Orfeo et al. | 252/67 |
| 4,679,403 | 7/1987 | Yoshida et al. | 62/114 |
| 4,680,939 | 7/1987 | Rojey et al. | 62/114 |
| 4,688,399 | 8/1987 | Reimann | 62/485 |
| 4,938,035 | 7/1990 | Dinh | 62/279 |

OTHER PUBLICATIONS

NRC 25463 "A Comparison of Ventilation Strategies for R-2000 Houses" J. W. Linton 1986 National Research Council Canada.
NRC No., 27719 "Design, Construction, and Testing of an Exhaust air heat Pump for R-2000 Houses" J. W. Linton 1987 National Research Council Canada.
"Heat Pumps in Cold Climates" Proceedings Aug. 13-14, 1990 Caneta Research Inc.

Primary Examiner—Albert J. Makay
Assistant Examiner—William C. Doerrler
Attorney, Agent, or Firm—Smart & Biggar

[57] ABSTRACT

A two-stage air-to-air heat pump comprises two passageways between the outside and inside of a building with a passive heat pump first stage and an active heat pump second stage. One end of the heat pump is disposed in one of the passageways and the other end in the other passageway and the pipe is tilted so one end is higher than the other. Similarly, one coil of the active heat pump is disposed in one passageway and the other coil is disposed in the other passageway. Air from the outside enters through one of the passageways, passes over one end of the heat pipe and then one of the coils into the inside. Air from the inside passes over the other end of the heat pipe and then the other coil to the outside. By choosing which end of the heat pipe is the higher end and the direction of the compressor, this two stage heat pump may either heat or cool air entering the enclosure. The passive heat pump has a core of heat pipes partially filled with a non-azeotropic refrigerant mixture of 70 parts R22 to 30 parts R152a.

8 Claims, 13 Drawing Sheets

PASSIVE HEAT PUMP WITH NON-AZEOTROPIC REFRIGERANT

BACKGROUND OF THE INVENTION

1. Field of the Invention

This invention relates to a non-azeotropic refrigerant for a passive heat pump.

2. Description of the Related Art

U.S. Pat. No. 3,789,621 issued 1974 to Inuzuka discloses a single stage air-to-air heat pump comprising a refrigeration circuit with a compressor, a coil disposed in a first passageway extending between the inside of a building and the outside environment, and a second coil disposed in a second passageway extending between the inside of a building and the outside environment. Inside air is passed over the first coil and then exhausted to the outside and outside air is passed over the second coil and then admitted to the inside. The pumping direction of the compressor may be selected so that the heat pump acts either to heat or cool air entering the building.

More recently, experimental work has been done on a two-stage heat pump system comprising a passive stage and an active stage. The passive stage may comprise an array of heat pipes, that is, closed pipes partially filled with pure refrigerant. The active stage comprises a compressor and coils. Again there are two passageways between the outside and inside of a building One end of the heat pipe array is disposed in one of the passageways and the other end in the other passageway and the pipe array is tilted so one end is higher than the other. Similarly, one coil of the active heat pump is disposed in one passageway and the other coil is disposed in the other passageway. Air from the outside enters through one of the passageways, passes over one end of the heat pipe array and then one of the coils into the inside. Air from the inside passes over the other end of the heat pipe array and then the other coil to the outside. By choosing which end of the heat pipe array is the higher end and the direction of the compressor, this two stage heat pump may either heat or cool air entering the building. The system was also tested with an electric heater in the passageway admitting air to the inside. It was found that the electric heater was mandatory where the outside temperature dipped to −25 degrees C. or less for extended periods since without the heater the admitted air was too cold. This experimental two-stage heat pump system is discussed in Linton, J. W. "A Comparison of Ventilation Strategies for R-2000 Houses" NRC No. 25463, TR-LT-004, National Research Council of Canada, 1986 and Linton, J. W. "Design, Construction, and Testing of an Exhaust Air Heat Pump for R-200 Homes" NRC No. 27719, TR-LT-013, National Research Council of Canada, 1987.

Non-azeotropic refrigerants have been contemplated for an active heat pump and it has been found that some mixtures hold promise, while other mixtures, such as a mixture of R22 and R152a, degrade performance. (See Sami, S. M. "Non-azeotropic Mixtures as Potential CFC Substitutes for Heat Pumps" Proceedings of the International Conference on Heat Pumps in Cold Climates Aug. 13–14, 1990, Moncton, N. B., Canada, pages 141–152.)

There remains a need for a more efficient heat pump, especially for cold climates, which may still admit outside air and exhaust inside air so as to maintain a healthy inside environment.

SUMMARY OF THE INVENTION

According to the present invention, there is provided a refrigerant for a passive heat pump comprising a non-azeotropic mixture of R22 and R152a mixed in the ratio of from 60 parts R22 to 40 parts R152a to 80 parts R22 to 20 parts R152a.

In another aspect there is provided an air-to-air heat pump comprising the following: a first and second passageway extending between an outside air environment and an inside air environment which is to be controlled; a first air moving means for moving air through said first passageway from said inside environment to said outside environment; a second air moving means for moving air through said second passageway from said outside environment to said inside environment; a passive heat pump means comprising a refrigerant containing closed heat pipe means having a first end disposed in said first passageway and its second end disposed in said second passageway, said heat pipe means moveable so that a selected one of said first end and said second end is the higher end; an active heat pump means comprising a refrigerant circuit having a first heat exchange means disposed in said first passageway between said passive heat pump means and said outside environment and a second heat exchange means disposed in said second passageway between said passive heat pump means and said inside environment and including reversible compressor means between said first and second heat exchange means for circulating refrigerant in said refrigerant circuit in a selectable direction; said refrigerant of said passive heat pump means comprising a non-azeotropic refrigerant mixture comprising R22 and R152a mixed in the ratio of between 60 parts R22 to 40 parts R152a and 80 parts R22 to 20 parts R152a; whereby said heat pump is operable to supply heated outside air to said inside environment when said second end of said heat pipe means is the higher end of said heat pipe means and refrigerant is circulated in said active heat pump means in such a direction that said second heat exchange means acts as a condenser.

BRIEF DESCRIPTION OF THE DRAWINGS

In the figures which disclose example embodiments of the invention.

DESCRIPTION OF THE PREFERRED EMBODIMENTS

Figure 1:
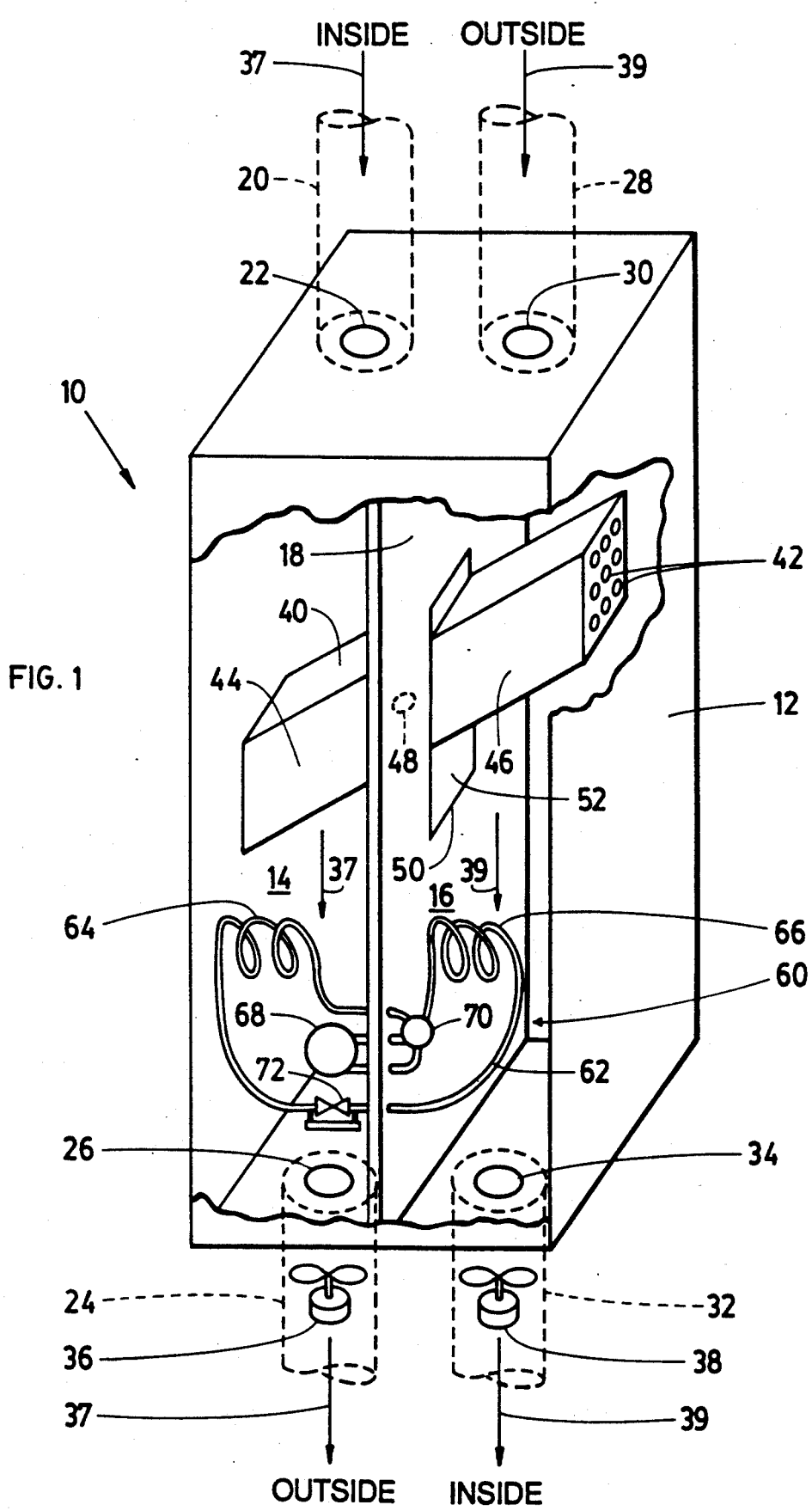
FIG. 1 is a partially cut away perspective view of a two-stage heat pump made in accordance with this invention.

Turning to FIG. 1, a two-stage air-to-air heat pump is illustrated generally at 10. The heat pump comprises a housing 12 divided into a first passageway 14 and a second passageway 16 by wall 18. One end of a conduit 20 opens to the inside environment and the other end to inlet port 22 of the first passageway; one end of a conduit 24 opens to outlet port 26 of the first passageway and the other end to the outside environment. One end of a conduit 28 opens to the outside environment and the other end to inlet port 30 of the second passageway. One end of a conduit 32 opens to the outlet port 34 of the second passageway and the other end opens to the inside environment.

A fan 36 is disposed within conduit 24 and may be operated to move air through the first passageway from the inside environment to the outside environment in the direction of arrows 37. Similarly, a fan 38 disposed within conduit 32 may be operated to move air through the second passageway from the outside environment to the inside environment in the direction of arrows 39.

A passive heat pump 40 comprises a plurality of closed pipes 42, each partially filled with refrigerant. The passive heat pump extends through an opening 50 in wall 18 so that one end 44 of the passive heat pump is disposed in the first passageway 14 and the other end 46 of the heat pump is disposed in the second passageway 16. The passive heat pump is supported in the wall opening by pivots 48. A flexible material 52 covers the portion of the opening not occupied by the passive heat pump so that there is no fluid communication between the first and second passageways. The flexible material allows the passive heat pump to be pivoted on pivots 48.

An active heat pump indicated generally at 60 comprises a refrigerant circuit 62 having a heat exchange coil 64 disposed in the first passageway 14 between the passive heat pump 40 and the inside environment and a second heat exchange coil 66 disposed in the second passageway 16 between the passive heat pump 40 and the outside environment. A compressor 68 is connected through a reversing valve 70 to the refrigerant circuit 62. The circuit 62 also includes an expansion device-capillary tube 72. The expansion device acts to throttle the flow of refrigerant in the refrigerant circuit 62.

Before discussing the refrigerant for the system, the basic operation of the two-stage heat pump is described. In winter time, the passive heat pump is tilted so that to about five degrees from the horizontal so that end 46 thereof is higher than end 44, as shown in FIG. 1. This causes liquid refrigerant in the heat pipes 42 to flow to end 44. Reversing valve 70 is configured so that when compressor 68 is activated refrigerant in the active heat pump will flow from coil 64 through the compressor and to coil 66. The expansion device ensures the pressure at the suction of the compressor 68 is lower than at its outlet. Thus coil 64 acts as an evaporator and coil 66 as a condenser. The compressor 68 and the fans 36 and 38 may then be activated.

Fan 36 draws warm household air through the first passageway over the low end 44 of the passive heat pump 40. The warm household air gives up heat to the refrigerant in the heat pipes 42 causing the refrigerant to evaporate and migrate to the high end 46 of the passive heat pump thus warming the high end of the passive heat pump. The warm air then passes over coil 64 giving up heat to the refrigerant therein so that the refrigerant circulates into coil 66 as vapour. Simultaneously, fan 38 draws cold outside air through the second passageway over the high end 46 of the passive heat pump. In doing so, the cold air absorbs heat from the wall of the passive heat pump which pre-heats the outside air. The taking of heat from end 46 of the passive heat pump causes the refrigerant vapour in the high end of the heat pipes 42 to give up its heat of condensation; the condensed refrigerant then flows back to the low end 44 of the passive heat pump. The pre-heated outside air then passes over coil 66 and absorbs heat therefrom which causes this refrigerant to condense. The outside air, warmed by this two-stage process, exhausts through port 34 to the interior of the building.

For summer operation, the passive heat pump is tilted in the opposite direction so that the end 44 becomes the high end and the end 46, the low end. The reversing valve 70 is operated so that the compressor directs refrigerant in circuit 60 in the opposite direction. Now when the compressor and fans are activated, warm outside air passing over the low end of the passive heat pump is pre-cooled as it gives up heat to the passive heat pump. The outside air then flows past coil 66 and gives up further heat to evaporate the refrigerant therein. The cooled outside air then flows into the building. Inside air entering port 22 is used to condense the refrigerant vapour at the high end 44 of the passive heat pump and in coil 64 before exhausting to the outside of the building.

Optionally, a humidifier may be located in the second passageway between the active heat pump and the outlet port 34.

Figure 2:
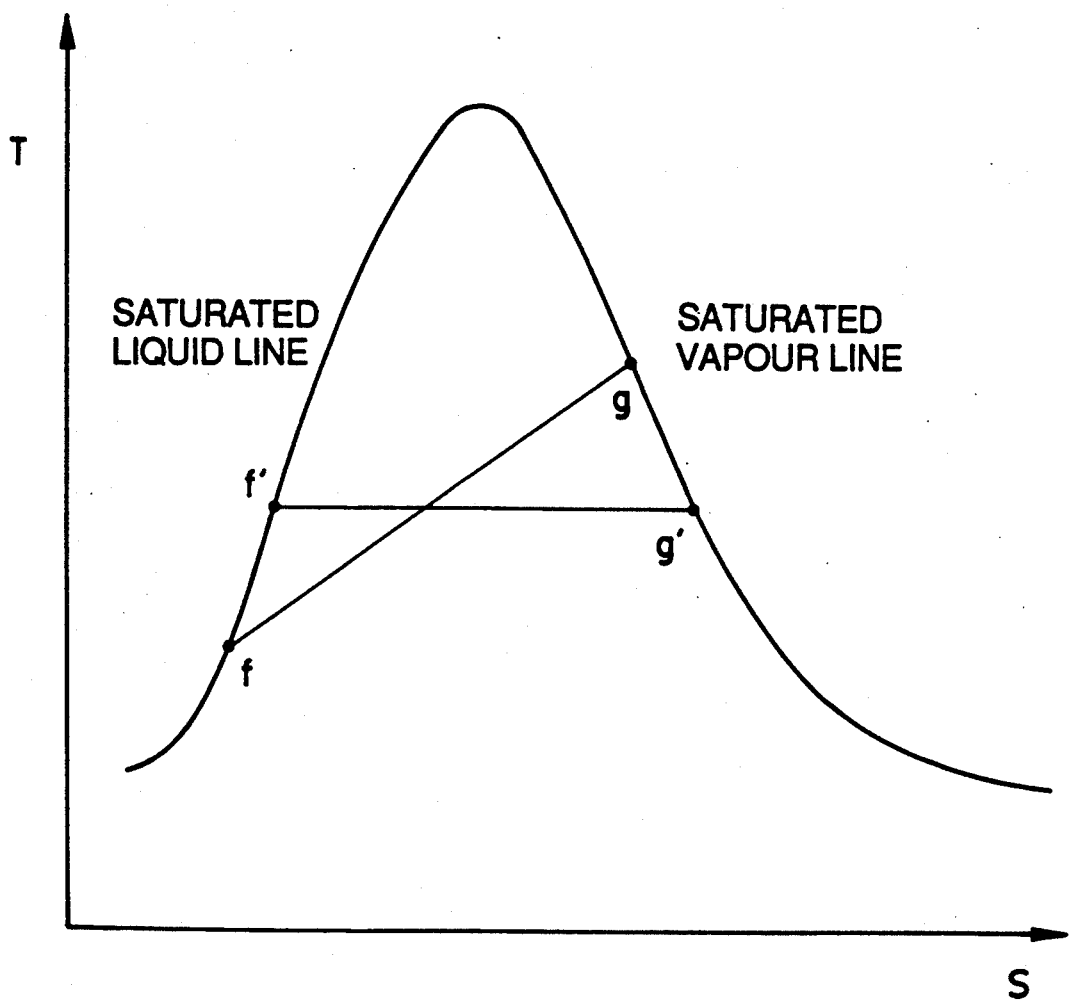
FIG. 2 is a temperature versus entropy graph.

Regarding the choice of a refrigerant for the passive heat pipes, reference is made to FIG. 2 which is a temperature versus entropy graph illustrating an isobaric heating or cooling process over a two phase region between a saturated vapour state and a saturated liquid state. The line f'-g' indicates the behaviour of a pure substance or an azeotropic mixture over these two phases and shows that such substances have a constant phase changing temperature at a given pressure. The line f-g indicates the corresponding behaviour of a non-azeotropic mixture and shows that non-azeotropic mixtures have separate boiling and condensing distributions. This property of a non-azeotropic mixture suggests the mixture may be desirable as a refrigerant for the passive heat pump since it boils at a relatively low temperature and condenses at a relatively high temperature.

Figure 3:
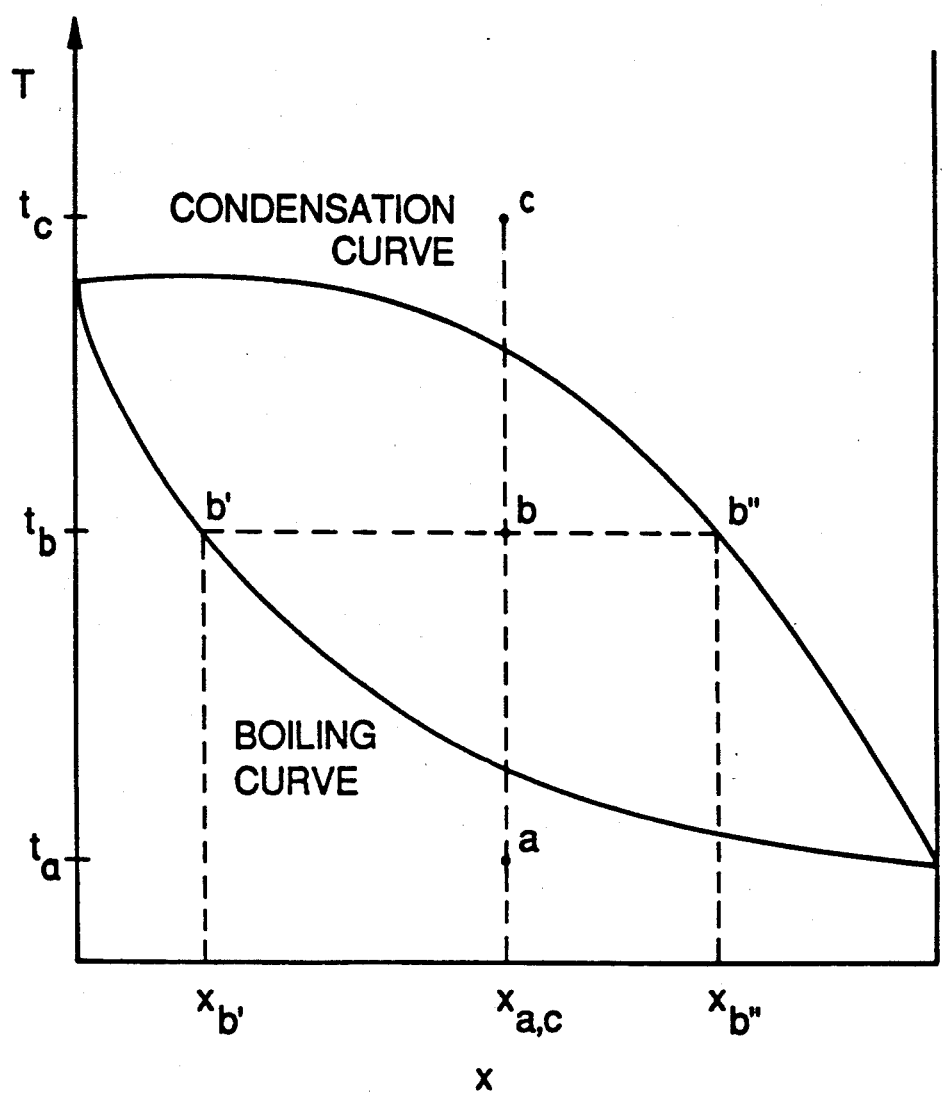
FIG. 3 is a phase diagram for a non-azeotrope.

FIG. 3 is a temperature (T) versus concentration (x) phase diagram which further illustrates the properties of nonazeotropic mixtures. As the temperature rises from $t_a$ to $t_b$ the mixture begins to boil and vapour is given off. At $t_b$ the concentration of the remaining liquid has a concentration of $x_{b'}$ and the concentration of the vapour is $x_{b''}$. At $t_c$ the concentration is again the same as at $t_a$.

Through theoretical calculations and experimentation (detailed hereinafter), it has been found that a non-azeotropic mixture comprising the refrigerant R22 and the refrigerant R152a mixed in the ratio of between 60 parts R22 to 40 parts R152a and 80 parts R22 to 20 parts R152a provides a particularly effective refrigerant for the passive heat pump (which is exposed to outside air in the two-stage heat pump), especially where the outside temperature is in the range of about −35 degrees Celsius to about 15 degrees Celsius. The preferred ratio is about 70 parts R22 to about 30 parts R152a, and the best efficiencies are achieved with this refrigerant mixture when the outside temperature is between about −35 degrees Celsius and −10 degrees Celsius. As will be apparent to those skilled in the art, R22 is the accepted designation for a refrigerant of the formula $CHClF_2$ and R152a is the accepted designation for a refrigerant of the formula $CHF_2CH_3$.

In the aforenoted ratios, the mixture of R22 and R152a possesses the following thermodynamic properties which are desirable for a heat pipe:

1. a high heat recovery efficiency where the outside temperature is in the range −35 to 0 degrees Celsius;
2. low boiling temperature (so that the refrigerant will evaporate at room temperature, which is the temperature of the high temperature end of the heat pipe when the subject heat pump is operating to heat outside air entering the enclosure);
3. low freezing temperature;
4. high latent heat of vaporisation (so that the vapour in the heat pipe holds a lot of energy);
5. proper P-x-T relationship;
6. low vapour and liquid specific volumes (so that the refrigerant, being dense, is capable of holding more energy per unit volume);
7. low volumetric cooling capacity (that is, the ability to cool air even at low air flow volumes); and
8. low condensing pressure (which reduces the stress of the operating fluid on the pipe).

This non-azeotropic refrigerant mixture also has the following desirable physical properties:

1. a high thermal conductivity of vapour;
2. low viscosity (which ensures condensed vapour will quickly flow back to the lower end of the heat pipe);
3. low molecular weight;
4. high equilibrium mixing and solubility; and
5. stability.

The effectiveness of this non-azeotropic mixture as a refrigerant was experimentally tested in a heat pump set-up identical to the heat pump illustrated in FIG. 1 with the active stage 60 removed. Referring to FIG. 1 and considering the active stage removed, the testing proceeded as follows. R22 and R152a refrigerant in a 70 to 30 ratio was first added to the heat pipes of the passive heat pump and the passive heat pump tilted five degrees from the horizontal so that end 44 of the passive heat pump was lower than end 46. Conduit 20 was connected to a source of air at twenty degrees Celsius and conduit 28 was connected to a source of air at −25 degrees Celsius. Fans 37 and 39 were then operated to draw air through the first passageway 14 and the second passageway 16 at 110 cubic feet per minute (CFM). Temperature measurements were made downstream of the passive heat pump in the second passageway from which was calculated sensible effectiveness, apparent effectiveness and the change in temperature across the condenser (i.e., the high side of the passive heat pump). Sensible effectiveness is the sensible energy recovered minus the supply fan energy, divided by the sensible energy exhausted plus the exhaust fan energy, corrected for cross-leakage (EATR). EATR is equal to 1—(net supply air flow/gross supply air flow). Apparent effectiveness is the measured temperature rise of the supply air stream divided by the temperature difference between air entering the heat pump from the outside and air entering the heat pump from the building and multiplied by the mass flow rate of the supply divided by the minimum of the mass flow rate of the supply or exhaust streams.

Figure 4:
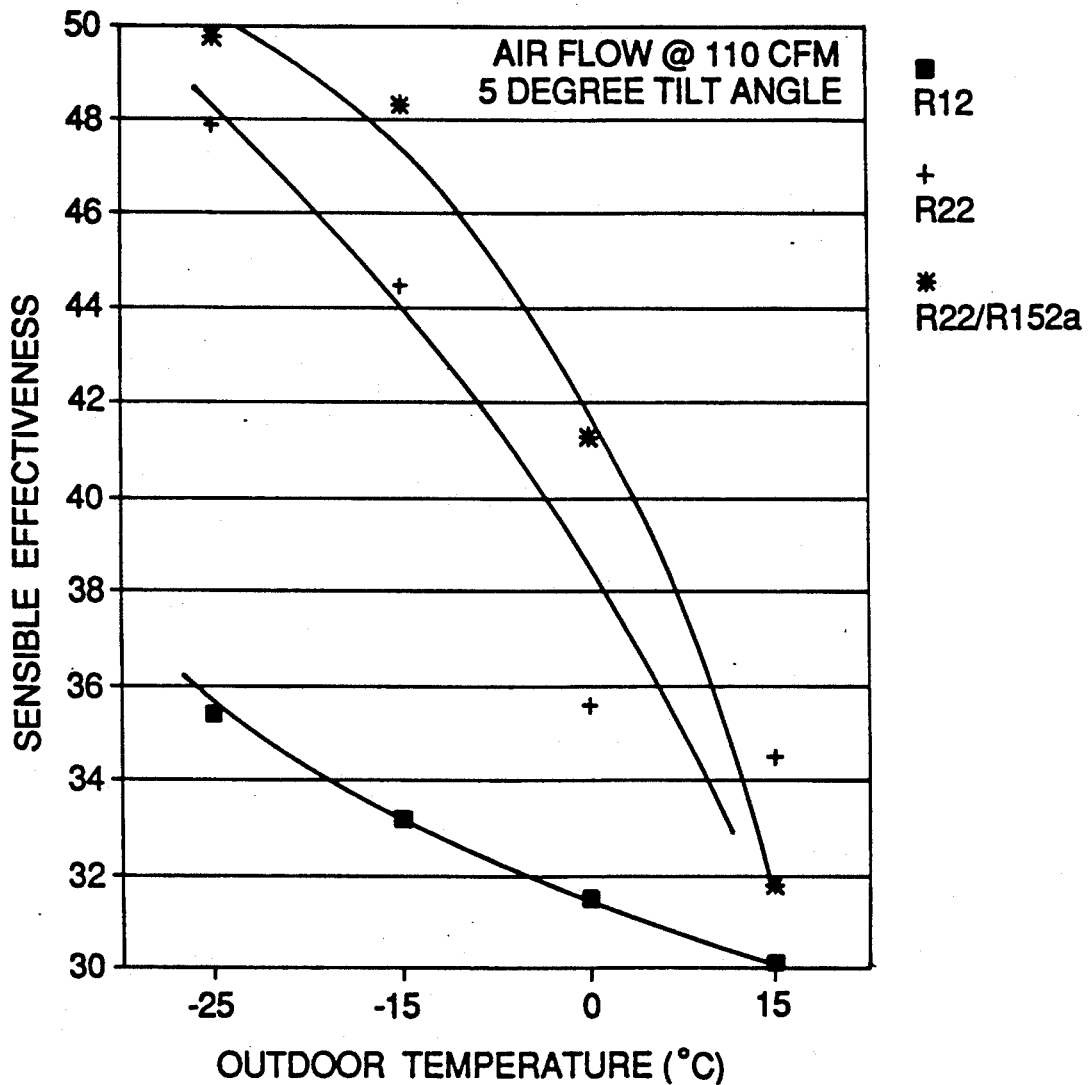
FIGS. 4 and 7 are graphs of the sensible effectiveness versus outdoor temperature of a heat pipe containing certain refrigerants.
Figure 5:
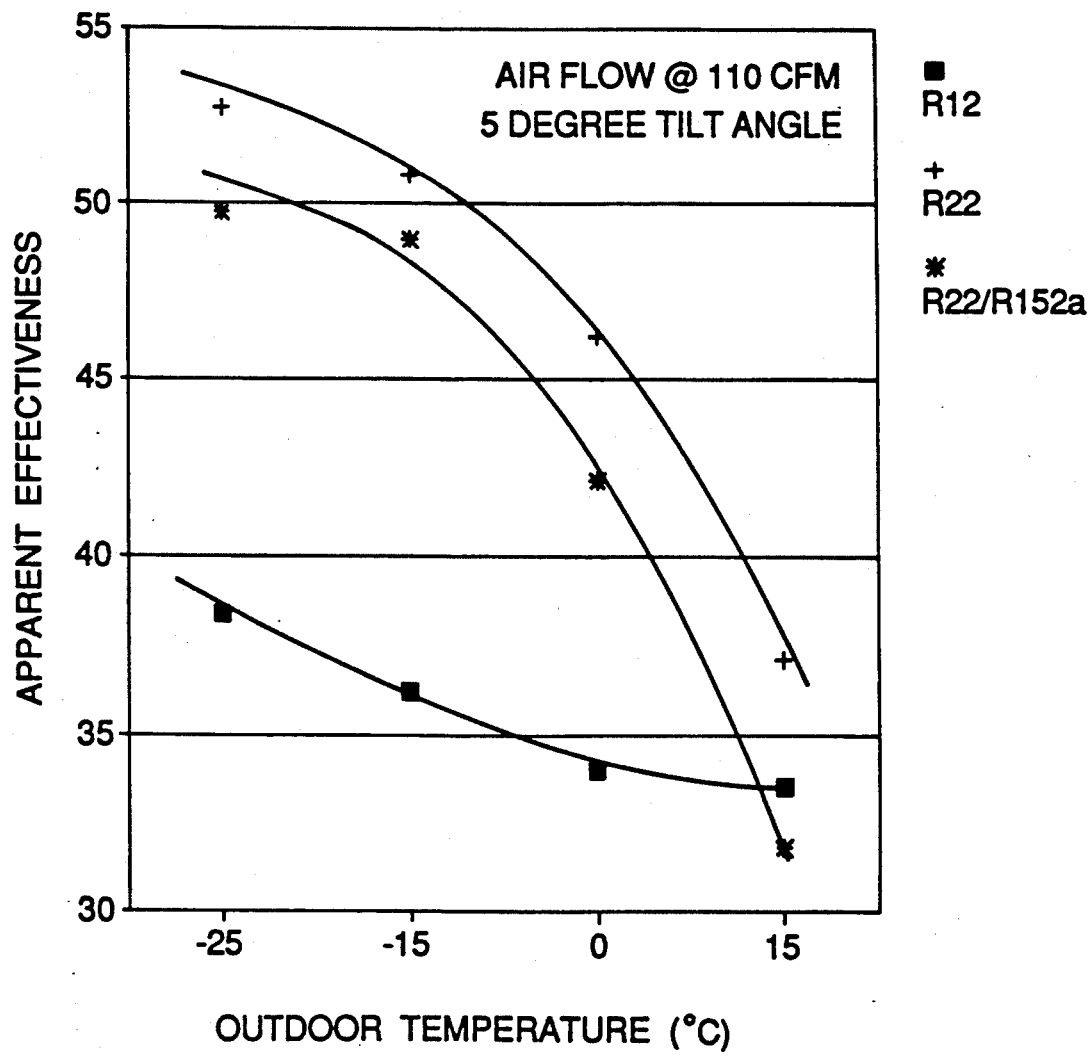
FIGS. 5 and 8 are graphs of the apparent effectiveness versus outdoor temperature of a heat pipe containing certain refrigerants.
Figure 6:
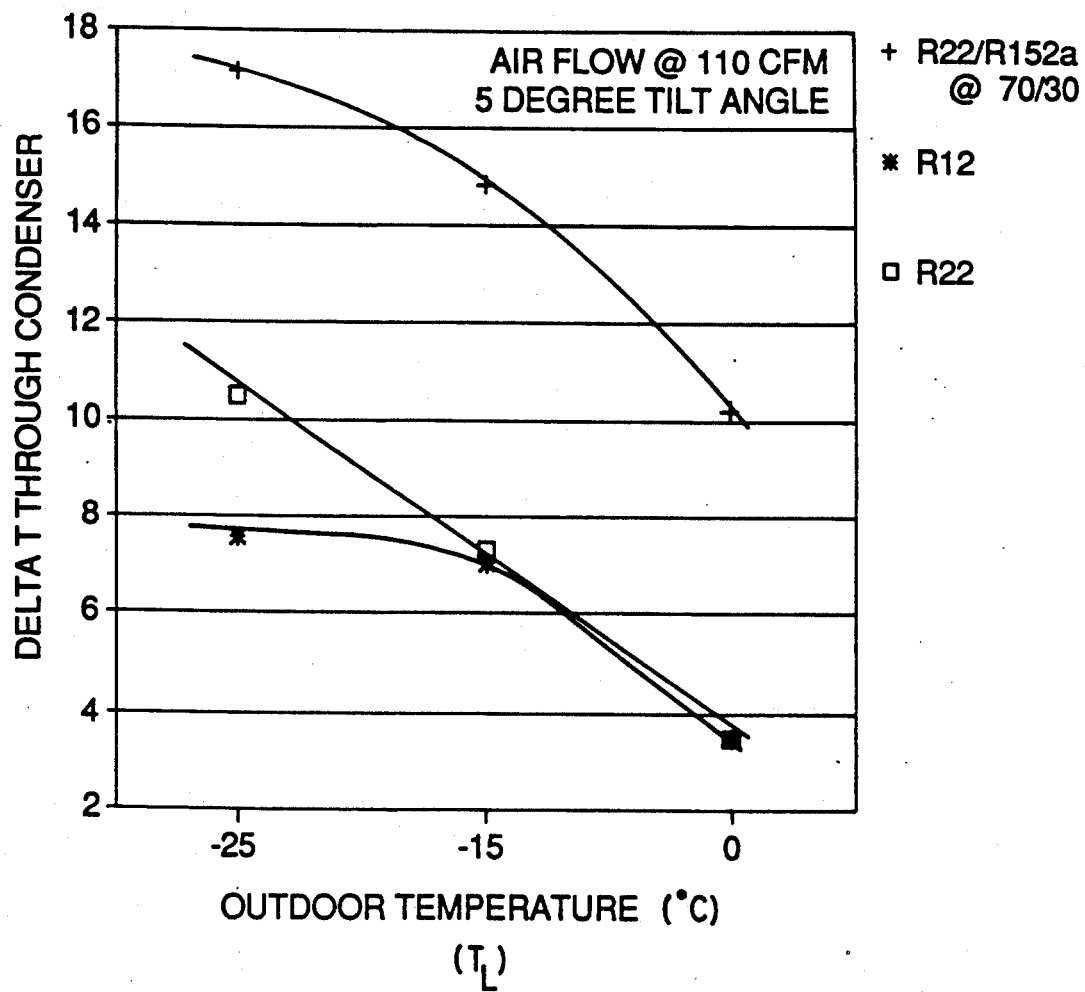
FIGS. 6 and 9 through 11 are graphs of the temperature change through the condenser versus outdoor temperature of a heat pipe containing certain refrigerants.

After making these measurements, conduit 28 was then connected to a source of air at −15 degrees Celsius and the temperature measurements and calculations repeated. The procedure was repeated again for air sources at temperatures of 0 degrees and +15 degrees and the results plotted. These results appear in FIGS. 4 through 6.

Figure 7:
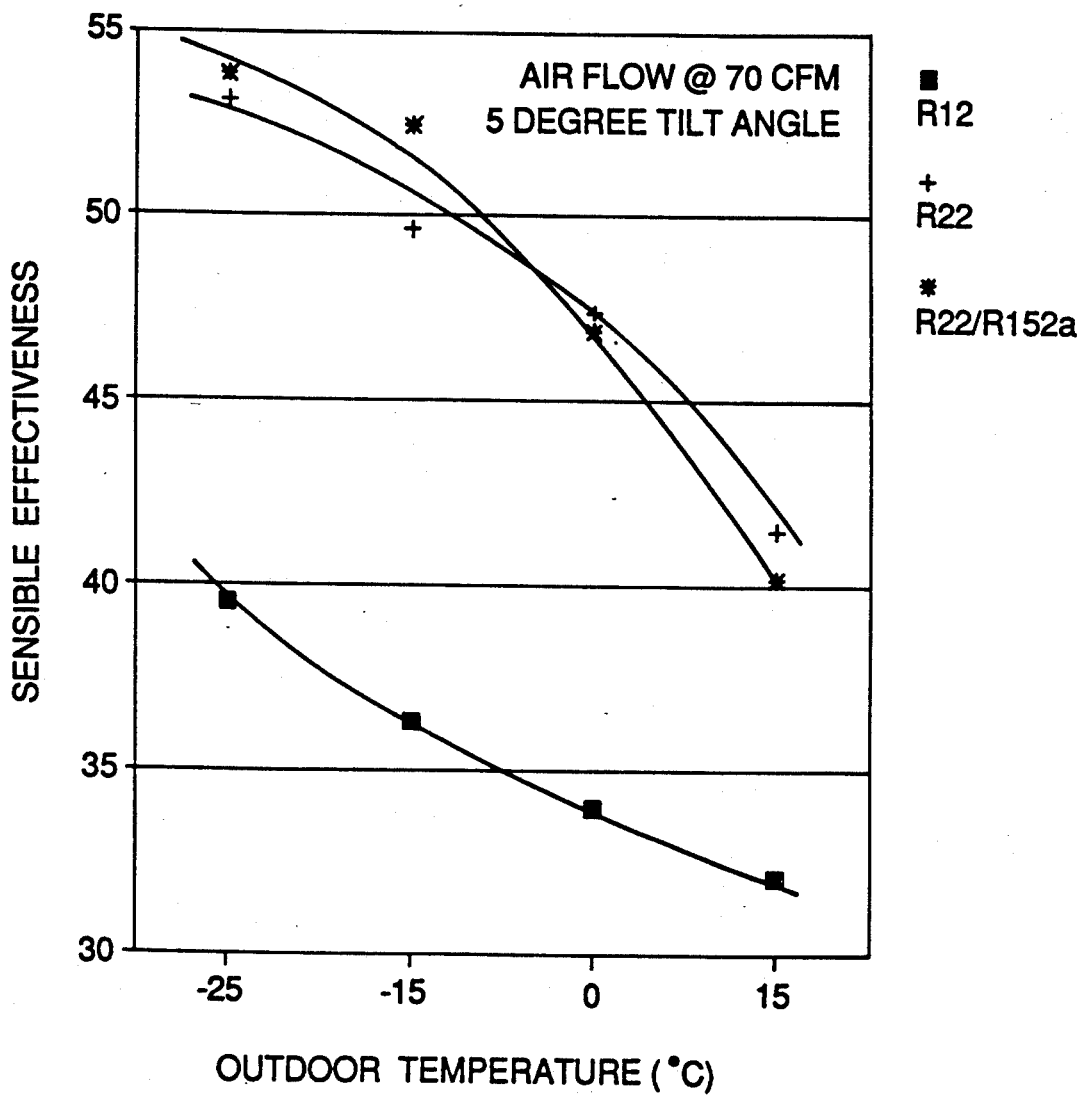
Figure 8:
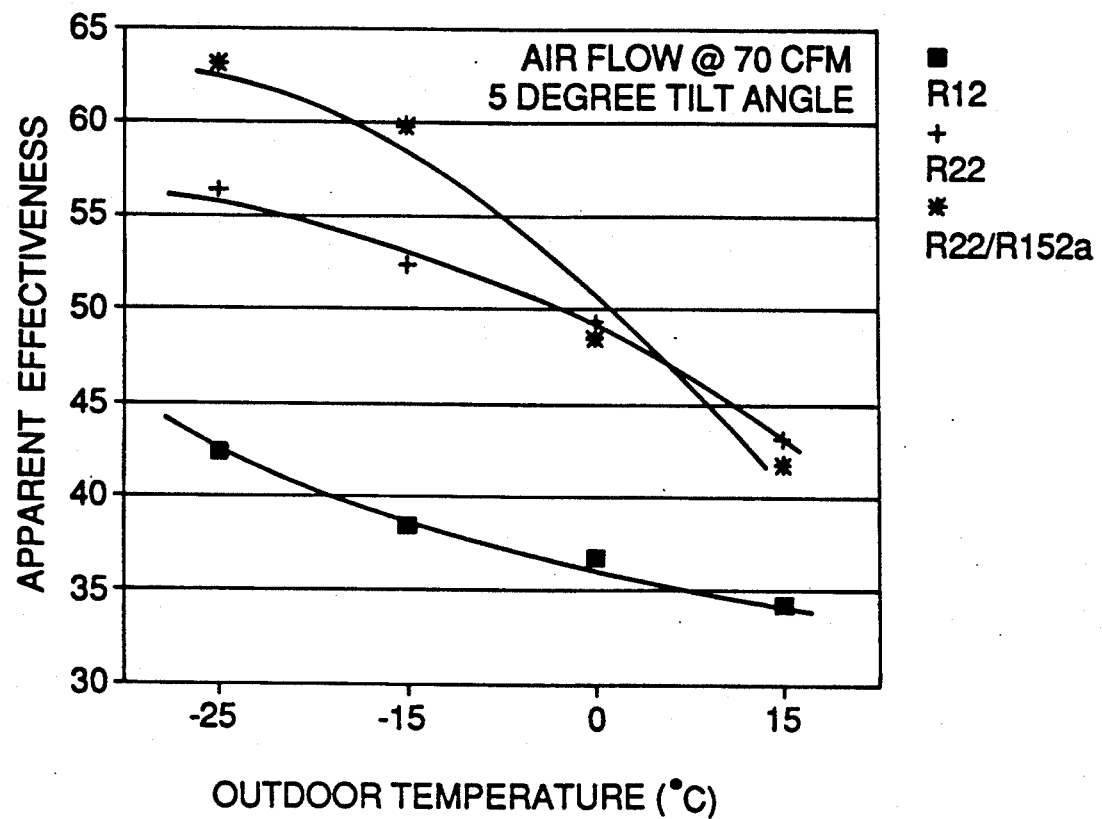
Figure 9:
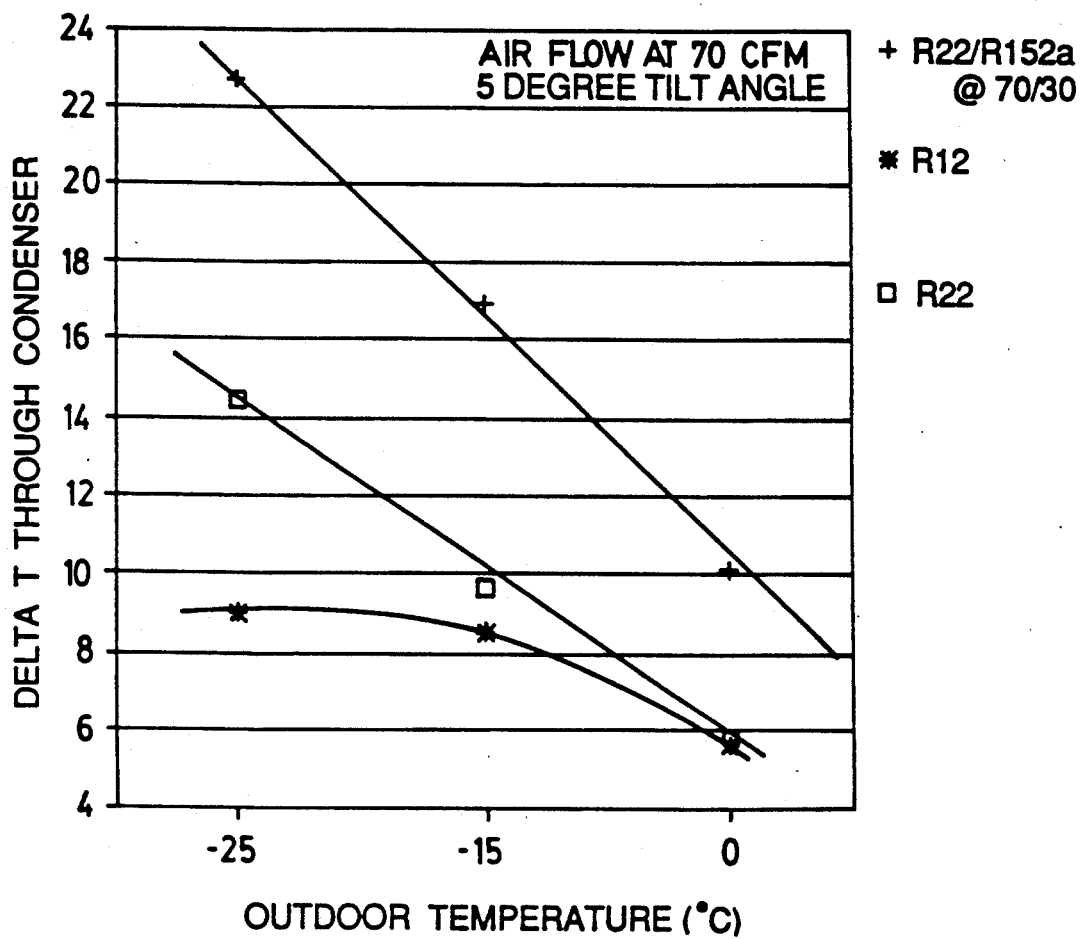

Fans 36 and 38 were then recalibrated to draw air at 70 CFM through the first and second passageways and the foregoing measurements and calculations again repeated. The results are plotted on FIGS. 7 through 9.

The R22 and R152a refrigerant mixture was then replaced with pure R12 and all of the foregoing measurements and calculations repeated. The results are again plotted on FIGS. 4 through 9. Then the R12 was replaced with pure R22 and the measurements and calculations again repeated and the results plotted on FIGS. 4 through 9.

By reference to FIGS. 4 through 9, it is seen that the R22-R152a 70-30 mixture generally outperformed pure R12 and pure R22 in heating air in the temperature range −25 degrees Celsius to 0 degrees Celsius.

Though not shown on the graphs, tests indicate the R22-R152a mixture is the more effective refrigerant down to −35 degrees Celsius. When the R22-R152a mixture is used to cool inside air (summer operation), the performance of the mixture is generally comparable to other refrigerants.

The co-efficient of performance (COP) of the passive heat pump varies directly with the recovery efficiency (i.e., the sensible and apparent effectiveness) of the passive heat pump. Accordingly, the experimental results indicate the R22-R152a mixture in the passive heat pump provides an improved COP for the passive heat pump.

Figure 10:
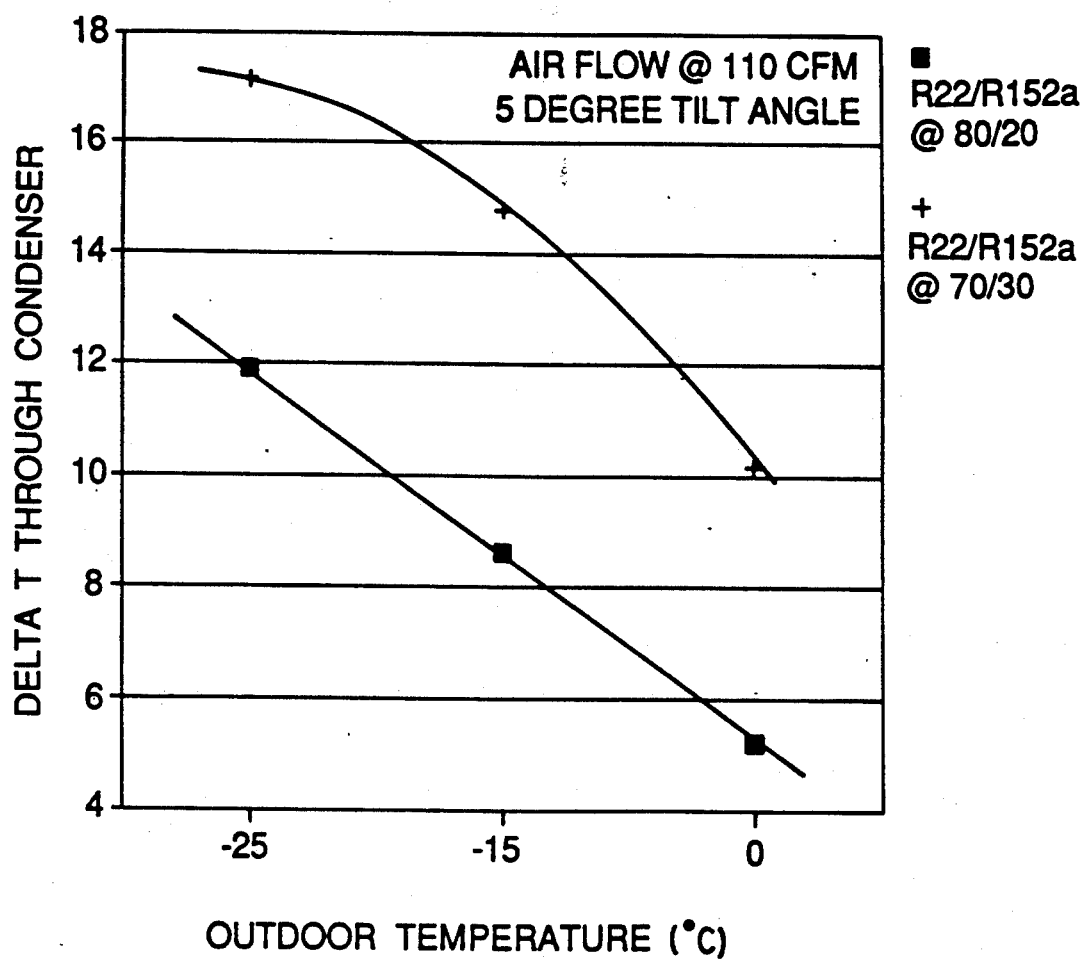
Figure 11:
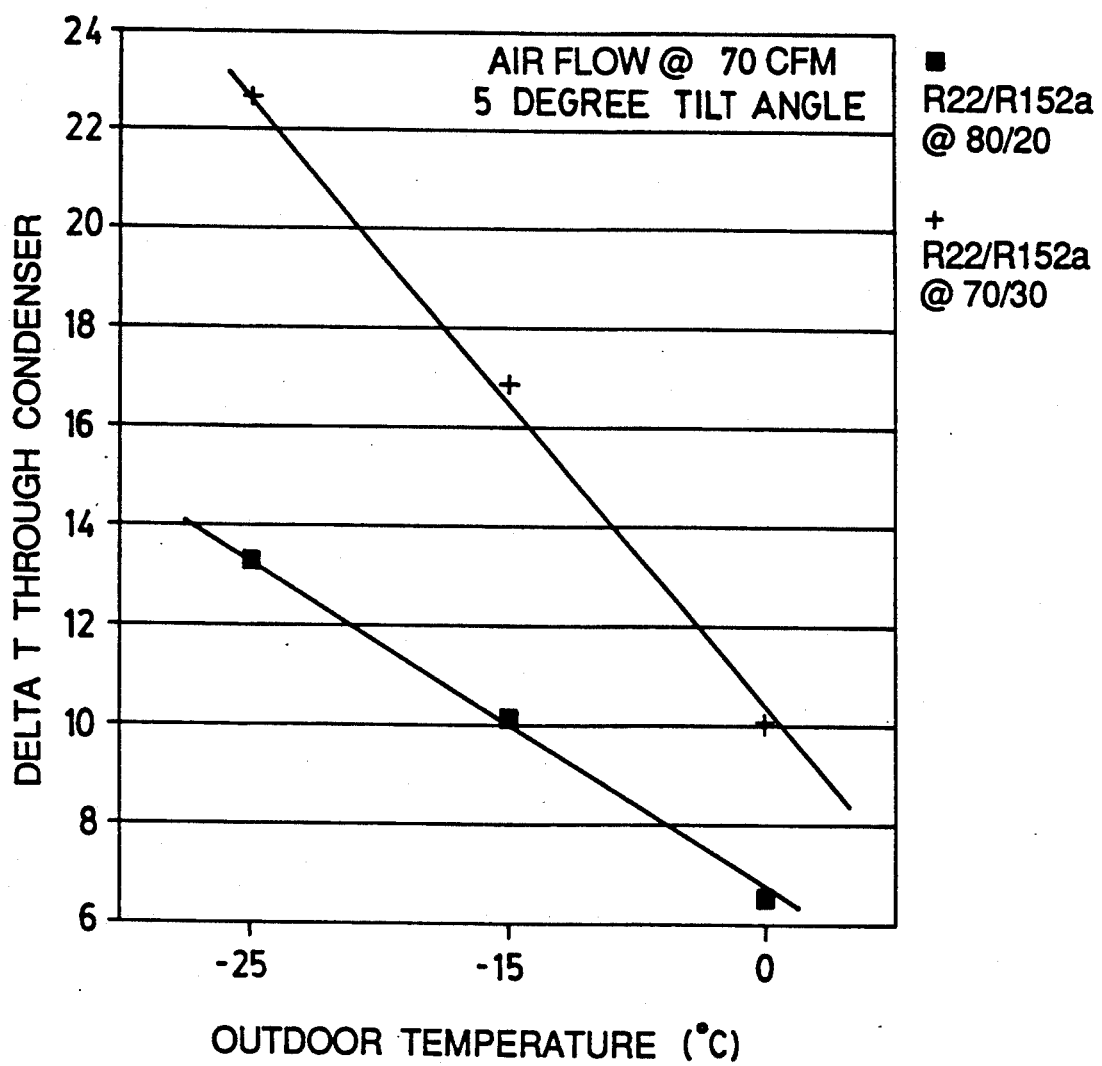

The refrigerant in the passive heat pump was then replaced with a mixture of 80 parts R22 to 20 parts R152a and measurements and calculations made in order to determine the change in temperature across the condenser for a 110 CFM air flow and a 70 CFM air flow. The results are plotted in FIGS. 10 and 11 against the previously determined results for R22'R152a in the ratio 70-30. By reference to FIGS. 10 and 11, it is seen that R22-R152a in the ratio 70-30 outperforms R22-R152a in the ratio 80-20.

The effectiveness of R12-R152a was tested in the two-stage heat pump of FIG. 1, as follows. A control refrigerant was added to the refrigerant circuit 62 of the active stage. The fans 36 and 38 were calibrated to provide air flow at 150 CFM and conduit 20 connected to a source of air at 20 degrees Celsius. An R22-R152a mixture in the ratio of 70 to 30 was added to the heat pipes and the heat pipes tilted five degrees from the horizontal with end 42 the higher end, as shown in FIG. 1. The fans and the compressor of the active stage were then activated and conduit 28 was connected to air supplies at various temperatures. Measurements were taken of the temperature of the air supplied to conduit 28 (outside temperature) and the temperature of air leaving conduit 39 (temp. air condenser). These measurements are plotted in FIG. 12. From these measurements, the COP of the two-stage heat pump was calculated and the results appear in FIG. 13. The refrigerant in the heat pipes was then changed to pure R12 and the foregoing repeated. The results again appear in FIGS. 12 and 13.

Figure 12:
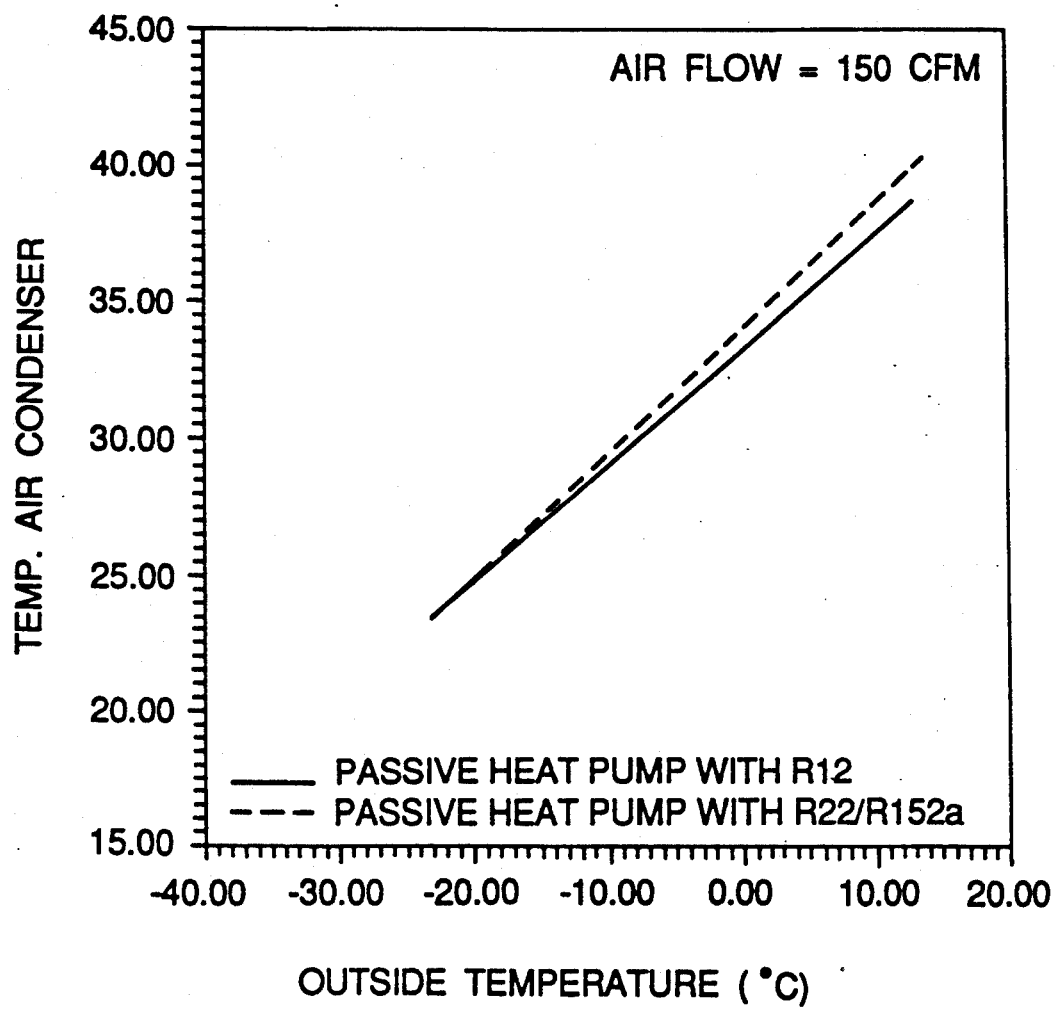
FIG. 12 is a graph of outside temperature versus the temperature of air leaving a two-stage heat pump containing certain refrigerants.
Figure 13:
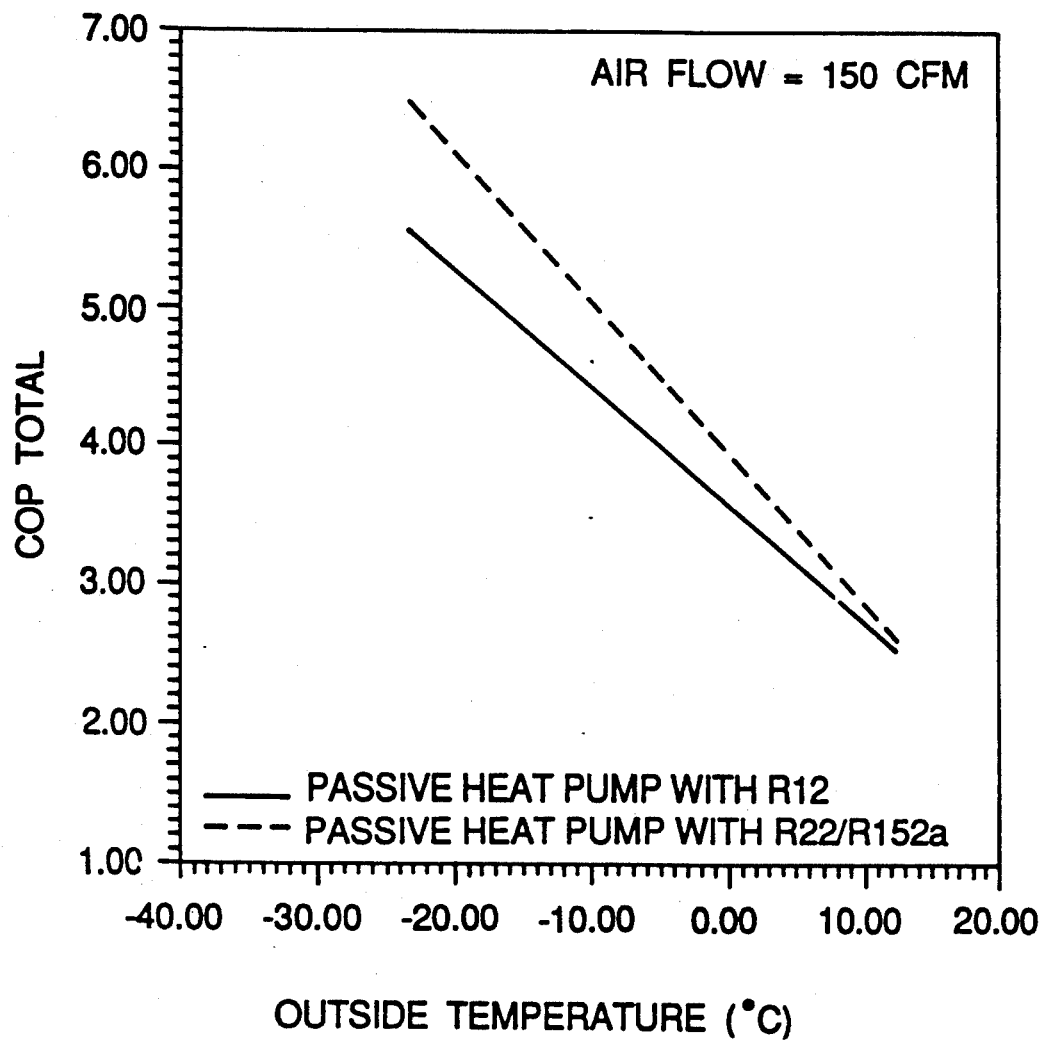
FIG. 13 is a graph of co-efficient of performance (COP) versus outdoor temperature for a two-stage heat pump containing certain refrigerants.

FIGS. 12 and 13 clearly show that the R22-R152a mixture improves the COP of the two-stage heat pump.

The R22-R152a mixture has certain further attributes which make it a desirable choice for a refrigerant. Firstly, it is a relatively environmentally friendly refrigerant. More specifically, considering the ozone depletion potential (ODP) of R12 to be 1.0, R22 has an ODP of 0.05 and R152a an ODP of 0. Furthermore, considering the greenhouse potential (GP) of R12 to be 1.0, R22 has a GP of 0.07 and R152a a GP of less than 0.1. So long as the ratio of R152a in the mixture does not exceed 30%, the mixture is non-flammable, hence another reason for the preferred ratio of 70 parts R22 to 30 parts R152a. This mixture is also non-toxic of low cost and readily available due to the availability of R22 and R152a.

The refrigerant in the refrigerant circuit of the active heat pump may be any known refrigerant or mixture of refrigerants, however, a judicious choice for such refrigerant or mixture of refrigerants can improve the overall COP.

Other modifications will be apparent to those skilled in the art and, accordingly, the invention is defined in the claims.

What is claimed is:

1. A refrigerant for a passive heat pump comprising a non-azeotropic mixture of R22 and R152a mixed in the ratio of from 60 parts R22 to 40 parts R152a to 80 parts R22 to 20 parts R152a.

2. The refrigerant of claim 1 wherein said ratio is about 70 parts R22 to about 30 parts R152a.

3. An air-to-air heat pump comprising the following:
a first and second passageway extending between an outside air environment and an inside air environment which is to be controlled;
a first air moving means for moving air through said first passageway from said inside environment to said outside environment;
a second air moving means for moving air through said second passageway from said outside environment to said inside environment;
a passive heat pump means comprising a refrigerant containing closed heat pipe means having a first end disposed in said first passageway and its second end disposed in said second passageway, said heat pipe means moveable so that a selected one of said first end and said second end is the higher end; said refrigerant of said passive heat pump means comprising a non-azeotropic refrigerant mixture comprising R22 and R152a mixed in the ratio of between 60 parts R22 to 40 parts and 80 parts R22 to 20 parts R152a;
an active heat pump means comprising a refrigerant circuit having a first heat exchange means disposed in said first passageway between said passive heat pump means and said outside environment and a second heat exchange means disposed in said second passageway between said passive heat pump means and said inside environment and including reversible compressor means between said first and second heat exchange means for circulating refrigerant in said refrigerant circuit in a selectable direction; whereby said heat pump is operable to supply heated outside air to said inside environment when said second end of said heat pipe means is the higher end of said heat pipe means and refrigerant is circulated in said active heat pump means in such a direction that said second heat exchange means acts as a condenser.

4. The air-to-air heat pump of claim 3 wherein said non-azeotropic refrigerant mixture of said passive heat pump means is about 70 parts R22 to about 30 parts R152a.

5. An air-to-air heat pump for use in an outside environment of about −35 degrees Celsius to about 15 degrees Celsius, comprising the following:
a first and second passageway extending between an outside air environment and an inside air environment which is to be controlled;
a first air moving means for moving air through said first passageway from said inside environment to said outside environment;
a second air moving means for moving air through said second passageway from said outside environment to said inside environment;
a passive heat pump means comprising a refrigerant containing closed pipe means having a first end disposed in said first passageway and its second end disposed in said second passageway such that said second end is higher than said first end; said refrigerant of said passive heat pump means comprising a non-azeotropic refrigerant mixture comprising R22 and R152a mixed in the ratio of between 60 parts R22 to 40 parts R152a and 80 parts R22 to 20 parts R152a;
an active heat pump means comprising a refrigerant circuit having an evaporator disposed in said first passageway between said passive heat pump means and said outside environment and a condenser disposed in said second passageway between said passive heat pump means and said inside environment and including compressor means between said condenser and evaporator for circulating refrigerant in said refrigerant circuit;
whereby said heat pump is operable to supply heated outside air to said inside environment;

6. The air-to-air heat pump of claim 5 wherein said non-azeotropic refrigerant mixture of said passive heat pump means is about 70 parts R22 to about 30 parts R152a.

7. In a passive heat pump means comprising one or more aligned closed pipes which are partially filled with refrigerant, the improvement wherein the refrigerant comprises a non-azeotropic mixture of R22 and R152a mixed in the ratio of from 60 parts R22 to 40 parts R152a to 80 parts R22 to 20 parts R152a.

8. The passive heat pump of claim 7 wherein the ratio of the non-azeotropic mixture is about 70 parts R22 to about 30 parts R152a.

* * * * *

UNITED STATES PATENT AND TRADEMARK OFFICE
CERTIFICATE OF CORRECTION

PATENT NO. : 5,189,884
DATED : March 2, 1993
INVENTOR(S) : Samuel M. Sami It is certified that error appears in the above-identified patent and that said Letters Patent is hereby corrected as shown below:

Column 7, line 51, after "40 parts" insert -- R152a --.

Signed and Sealed this

Thirtieth Day of November, 1993

Attest:

BRUCE LEHMAN

Attesting Officer

Commissioner of Patents and Trademarks